United States Patent [19]

Bannister et al.

[11] Patent Number: 5,046,378
[45] Date of Patent: Sep. 10, 1991

[54] ANTI-JAMMING GEAR ARRANGEMENT

[75] Inventors: Ray L. Bannister, Richmond; Frederick C. Close, Great Amwell; Peter J. Loeber, Earith, all of United Kingdom

[73] Assignee: Pitney Bowes Inc., Stamford, Conn.

[21] Appl. No.: 931,363

[22] Filed: Nov. 14, 1986

[30] Foreign Application Priority Data

Nov. 18, 1985 [EP] European Pat. Off. ............ 85308400

[51] Int. Cl.[5] ............................................. G07B 17/00
[52] U.S. Cl. ....................................... 74/435; 74/461; 101/110
[58] Field of Search ................. 74/435, 457, 460, 461, 74/462, 409, 437, 440; 101/110

[56] References Cited

U.S. PATENT DOCUMENTS

| | | | |
|---|---|---|---|
| 581,613 | 4/1897 | Pippin | 74/461 |
| 674,447 | 5/1901 | Mase | 74/461 |
| 694,784 | 3/1902 | Ramsay | 74/461 |
| 1,127,942 | 2/1915 | Theofanidis | 74/435 |
| 1,620,665 | 3/1927 | Kohler | 74/435 |
| 1,968,347 | 7/1934 | Ochsenbein | 101/110 |
| 3,589,281 | 6/1971 | Woodhead | 101/110 |
| 4,335,651 | 6/1982 | Schleuchardt | 101/110 |
| 4,408,524 | 10/1983 | Nüchel et al. | 101/110 |

FOREIGN PATENT DOCUMENTS

| | | | |
|---|---|---|---|
| 0200348 | 12/1955 | Australia | 74/460 |
| 0224620 | 6/1987 | European Pat. Off. | |
| 2320340 | 11/1974 | Fed. Rep. of Germany | 74/462 |
| 2087090 | 4/1976 | U.S.S.R. | 74/437 |
| 2180193 | 3/1987 | United Kingdom | |

Primary Examiner—Dwight Diehl
Assistant Examiner—Scott Anchell
Attorney, Agent, or Firm—Robert E. Meyer; David E. Pitchenik; Melvin J. Scolnick

[57] ABSTRACT

A gear arrangement includes a first gear wheel 10 having a section 12 with missing teeth. A second gear wheel 14 is arranged to mesh with the first gear wheel 10. The first tooth 16 on the first gear wheel 10 to engage with the second gear wheel 14 (following the missing teeth section 12) is resiliently movable inwardly within a radial slot 18 to withdraw when engaging an opposing tooth 22. A spring 20 urges the tooth 16 outwardly to one side of the opposing tooth 22 and into a gap on that side of the opposing tooth 22, so as to align the first and second gear wheels. Such a gear arrangement has particular use in a geared value setting mechanism provided on a print drum shaft of a postage meter.

3 Claims, 3 Drawing Sheets

ANTI-JAMMING GEAR ARRANGEMENT

FIELD OF THE INVENTION

This invention relates to an anti-jamming gear arrangement, and is especially applicable to a particular type of postage meter.

BACKGROUND OF THE INVENTION AND PRIOR ART

In certain situations, a gear wheel may have a number of missing teeth along a section of its periphery. This will generally be the case where it is required that a second gear wheel, otherwise in mesh with the first gear wheel, have the possibility of rotation independent of the first gear wheel. When the first gear wheel is turned so that the section having missing teeth faces the second gear wheel and therefore the wheels are not in mesh, the second gear wheel can be rotated without rotating the first wheel. However, if now the first gear wheel is turned so as to re-mesh with the second wheel, the individual gear teeth may not be aligned and problems can arise with re-engagement of the wheels. Significant tooth wear can result and in certain circumstances the gears may even jam together.

In one type of postage meter, a printing drum is provided in which separate value print wheels can rotate to present a selected value on the drum for printing. This rotation of the value print wheels can be achieved by longitudinal movements of corresponding value selection racks slidably mounted within a shaft on which the print drum is mounted. The whole of this shaft and print drum arrangement must be able to rotate in order to provide the required printing action of the print drun, and therefore some means has to be provided for adjusting the longitudinal position of each value selection rack with respect to the shaft. One such means includes gear wheels mounted concentrically on the shaft and movable relative to the shaft with the provision of means for translating the rotational movement of each gear wheel into an appropriate longitudinal movement of the value selection rack. This can take the form of an internal pinion and shaft in association with a helical gear, or a bevel gear and pinion gear arrangement acting on a tooth portion of the value selection rack.

Value selection in such a postage meter is thus achieved by rotating the appropriate gear wheel with respect to the print drum shaft when this shaft is in its stationary home position. This rotation can be achieved simply by providing an appropriate meshing gear train in which value setting is achieved by actual manual rotation of selector wheels attached to the gear train. Another value selection mechanism is disclosed in our co-pending European Patent Application No. 85308399.6 (our ref: E129/2), in which the appropriate gear rotation is achieved by depression of value setting push buttons.

However such rotation of the value setting gear wheels on the print drum shaft is effected, it is initially necessary for these gear wheels to be rotatable about the shaft to allow such setting, but subsequently to be fixed with respect to the shaft, once setting has been completed and a franking operation is commenced resulting in rotation of the print drum and its shaft. Without the fixed relationship between the value setting gear wheels and print drum shaft during franking, it would be possible for the selected values to be changed by relative rotation between gear wheels and shaft. Clearly this would be unacceptable.

This required function of the value setting gear wheels can be achieved by including sections of missing teeth on selected gear wheels of the mechanism, such that certain gears are not in mesh when the print drum shaft is in its stationary home (value setting) position, but are caused to mesh and thus prevent turning of the value setting gear wheels relative to the shaft once a franking operating causes the shaft to move away from its home position.

If one or more of the value decade settings has been inadvertantly moved to a position between two adjacent discrete values, a number of problems could arise.

Firstly, as described above, re-meshing of the gears (once a franking operation has commenced) may be a problem if the teeth on the gears are misaligned.

Secondly, if the value setting is at an intermediate position, the respective print wheel will also be at an intermediate position, resulting in improper franking.

Finally, the postage meter will also include some means for accounting for the franked values, and in the above-described type of postage meter, such accounting means may include "rising tooth" mechanisms adjacent the value setting gear wheels on the print drum shaft. These mechanisms will be described in greater detail hereinafter, but briefly the number of teeth to have risen is dependent on the value set, and these teeth are then counted mechanically when the print drum shaft rotates during franking and are added to a cumulative total in a counter. Intermediate setting will result in uncertainty whether or not a particular unit in a value decade has been registered by the counter.

In has previously been proposed, for example in UK Patent Specification No. 1 584 391, that gear teeth be provided with a degree of resilience in a direction tangential to the gear periphery. In contrast to the present invention, this proposal was directed to ensuring more even meshing between gears, and equalising the forces acting on the individual gear teeth.

SUMMARY OF THE INVENTION

According to one aspect of the invention, there is provided a gear arrangement characterised by a first gear wheel having a section with missing teeth and a second gear wheel arranged to mesh with the first gear wheel, wherein the first tooth on the first gear wheel to engage with the second gear wheel after the missing teeth section is resiliently movable in an inward radial direction, the arrangement being such that in use the resilience urges the tooth outwardly to one side of an opposing tooth on the second gear wheel and into a gap on that side of the opposing tooth, so as to align the first and second gear wheels.

According to another aspect of the invention, there is provided a gear arrangement for a print drum shaft of a postage meter, the arrangement being characterised by:

at least one value selection gear set provided on the print drum shaft and including a rotatable gear wheel, rotation of the rotatable gear wheel with respect to the shaft providing a setting of print wheels in a print drum connected to the print drum shaft; and an aligning gear on a shaft parallel to the print drum shaft and operable to mesh with the rotatable gear wheel of the value selection gear set, a part of the aligning gear adjacent the rotatable gear wheel when the print drum shaft is in a value setting position having a section of missing teeth so as to allow value setting by operation of the rotatable gear wheel, the section of missing teeth being terminated by a resiliently movable tooth operable when the print drum shaft moves out of the home position to move resiliently in an inwardly radial direction when urged by an opposing tooth on the rotatable gear wheel when out of alignment, the arrangement being such that in use the resilience urges the tooth outwardly to one side of the opposing tooth on the rotatable gear wheel into a gap on that side of the opposing tooth, so as to align the rotatable gear wheel with respect to the print drum shaft.

BRIEF DESCRIPTION OF THE DRAWINGS

The invention will now be described, by way of illustrative and non-limiting example, with reference to the accompanying drawings, in which.

PARTICULAR DESCRIPTION OF EMBODIMENTS OF THE INVENTION

Figure 1A:
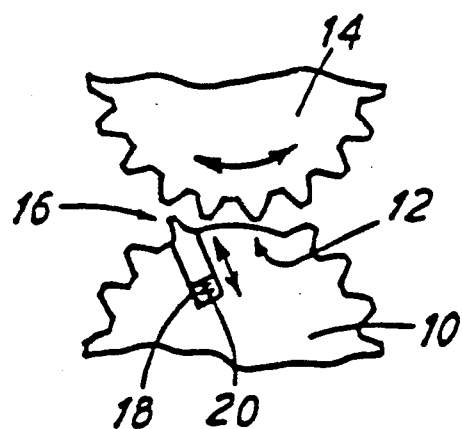
FIGS. 1A, 1B and 1C are schematic representations of two gear wheels according to an embodiment of the invention, in various operative positions.
Figure 1B:
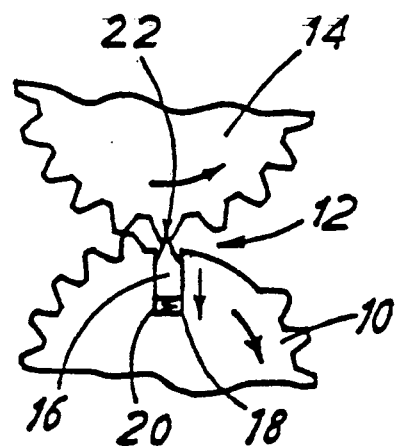
Figure 1C:
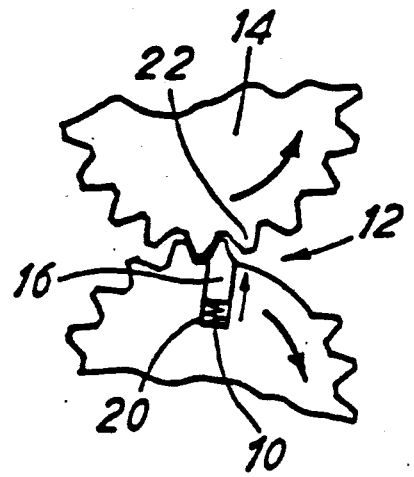

Referring to FIGS. 1A, 1B and 1C, a gear arrangement includes a first gear wheel 10 having a section 12 with missing teeth, and a second gear wheel 14 with a continuous set of teeth around its periphery.

As shown in FIG. 1A, the section 12 of missing teeth on the wheel 10 is aligned with the second wheel 14, and in that position, free rotation of the second wheel 14 in either direction is possible.

However, if the wheel 10 is rotated in a clockwise direction, and assuming that equivalent movement is imparted to the second wheel 14 but in an anticlockwise direction, the previously described problems of wear or jamming would result if the wheels 10 and 14 were not in strict alignment.

In order to avoid this problem, a preferred embodiment of the invention includes a radially sprung tooth 16, biased outwardly, and provided as the first tooth following the missing tooth section 12 on the first gear wheel 10. The tooth 16 is located within a slot 18 in the gear wheel 10, a spring 20 being positioned in the slot 18 under the tooth 16. The peak or nose of the sprung tooth 16 is slightly offset towards the first solid tooth, and the profile of the tooth 16 is concave.

In operation, and referring now to FIG. 1B, as the wheels 10 and 14 rotate in the directions shown by the respective arrows, the sprung tooth approaches the teeth on gear wheel 14. Assuming that the gear wheels 10 and 14 are out of synchronization to the extent that a gear lobe 22 on the wheel 14 will push the sprung tooth 16 against the force of spring 20 down into the slot 18, since the peak of the sprung tooth 18 is offset towards the first solid tooth adjacent thereto, this means that the first solid tooth on the gear wheel 10 will not be directly opposite a tooth on the gear wheel 14, but will tend to engage a gap and therefore correct gear meshing will take place. Assuming that the drive to gear wheels 10 and 14 allows some degree of relative movement therebetween, the gear wheels 10 and 14 will tend to realign their mutual orientation in such a way that the spring tooth 16 is engaged in the appropriate gap between teeth on the gear wheel 14.

In the situation where direct lobe to lobe contact does not occur between a gear lobe on the gear wheel 14 and the sprung tooth 16, due to the concave profile of the sprung tooth 16 the force of the spring 20 will tend to urge the tooth 16 to one side or the other of the opposing lobe 22, as shown in FIG. 1C, and therefore the mutual orientation of the gear wheels 10, 14 will again be realigned to the extent that proper meshing of the solid teeth will be assured.

Figure 2:
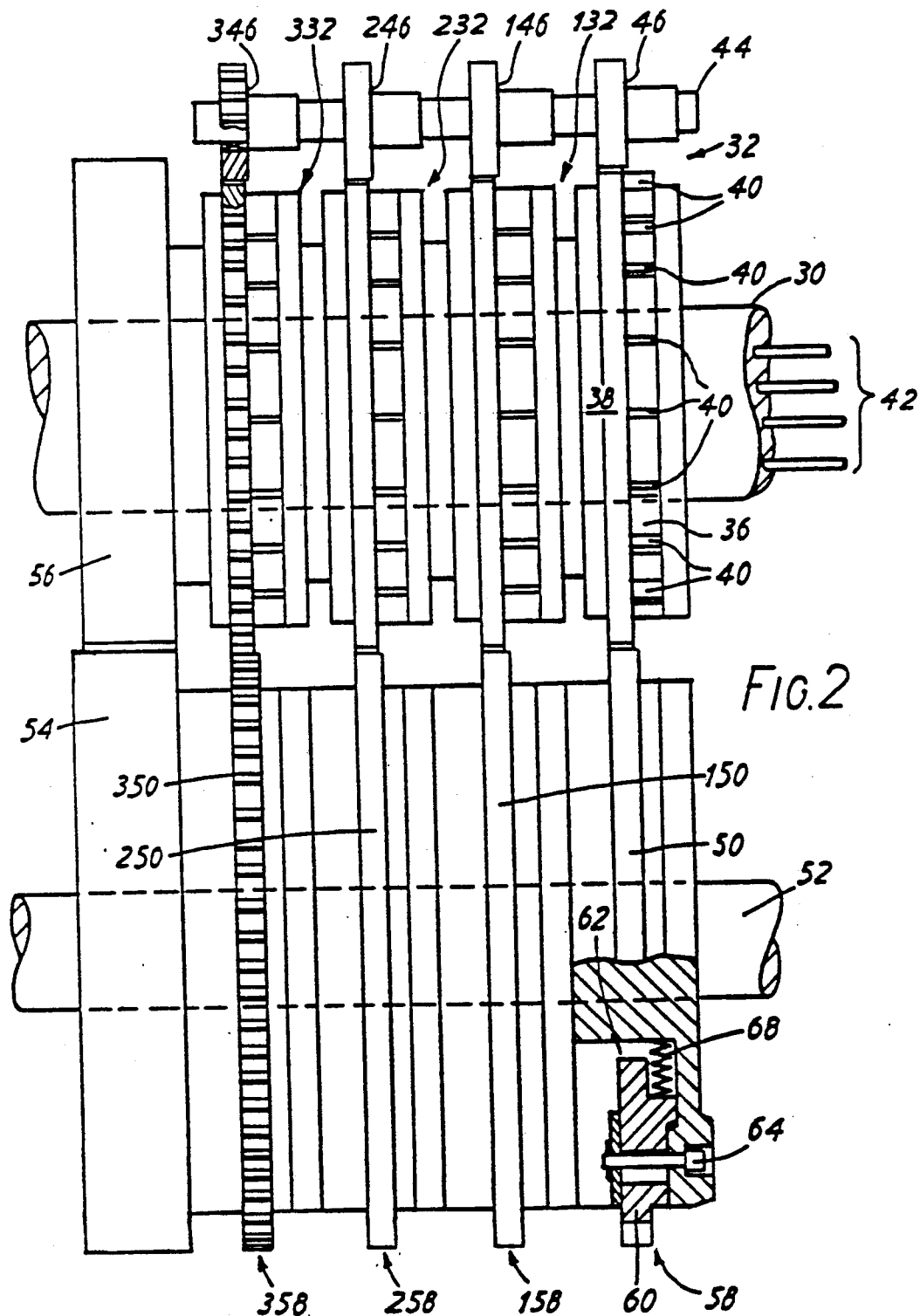
FIG. 2 is a plan view (with a part shown broken away) of value setting gear wheels on a print drum shaft and associated gear wheels, which form part of a postage meter, the gear wheels operating in similar manner to those of FIGS. 1A, 1B and 1C.

This type of anti-jamming mechanism is particularly suitable for a print wheel setting gear arrangement in a postage meter. FIG. 2 shows part of such an arrangement.

Referring to FIG. 2, a print drum shaft 30 of a postage meter carries four rising tooth assemblies 32, 132, 232, 332. Each of these assemblies is similar and so only assemly 32 will be described in detail. The assembly 32 includes a rising tooth housing 36 (to be described in more detail hereinafter) which is fixed on the print drum shaft 30. A value selector gear wheel 38 is mounted for rotation about the shaft 30, and hence also with respect to the rising tooth housing 36. The rising tooth housing 36 includes nine slots about its periphery and teeth 40 can be seen projecting from the slots in the housing 36. (The slots in the other rising tooth assemblies 132, 232, 332 are shown for contrast without projecting teeth.)

Briefly stated, the value selecting operation of the rising tooth assemblies relies on the rising teeth 40 being controlled by a profiled slot within the rotatable gear wheel 38. Assuming that all of the rising teeth 40 are initially withdrawn within the housing 36, as the gear wheel 38 is rotated with respect to the housing 36, the rising teeth 40 are caused to emerge, one by one, out of their respective slots. Thus the number of rising teeth 40 projecting from their slots is dependent on the angular displacement between the rotatable gear wheel 38 and the housing 36. Since this angular displacement is itself dependent on the value setting which has been input to the postage meter (as will be described hereinafter), the number of projecting teeth can be arranged to be direct measure of the value which has been set. A counter (not shown) is arranged such that a gear is advanced by the projecting rising teeth as the shaft 30 rotates during a franking operation, and the rotation of that gear produces a count input to the counter for franked value accumulation. An example of a suitable counter is disclosed in U.S. Pat. No. 2,774,537. An example of a typical rising tooth mechanism is disclosed in U.S. Pat. No. 2,510,350.

Rotation of the value selector gear wheel 38 relative to the housing 36 has a further effect. Value selection racks 42 are slidably positioned in corresponding slots within the print drum shaft 30. A print drum (not shown) is fixedly attached to the far right hand end of the shaft 30, and print wheels in the print drum are rotated by corresponding ones of the racks 42. A suitable arrangement of print drum, print wheels and shaft is disclosed in our co-pending UK Patent Application No. 8522831. Each of the value selection racks 42 is operably connected to one of the rising tooth assemblines 32, 132, 232, 332 such that angular displacement between the respective rotatable gear wheel and the housing 36 is translated into a longitudinal displacement of the corresponding rack 42. The rotational movement of the gear wheel 38 can be translated into the appropriate longitudinal movement of the value selection rack 42 by the provision of a pinion and face gear. Other possible arrangements include an internal pinion and shaft associated with a helical gear, or a bevel gear and pinion gear arrangement acting on a toothed portion of the rack 42.

Accordingly, relative rotation between the housing 36 and the gear wheel 38 will firstly cause the appropriate number of rising teeth 40 to project from their respective slots in the housing 36, and secondly will result in a consequent longitudinal movement of the respective value selection rack 42 which itself will cause the corresponding print wheel on the print drum to be set. Thus when the four sets of rising tooth assemblies have each been set appropriately, each corresponding to one decade of a possible four digit decimal value, the correct value is set on the print drum, awaiting a franking operation, and also the correct value to be accounted is set on the rising tooth mechanism, awaiting a franking operation for the value to be accumulated in the counter.

Referring again to FIG. 2, a further shaft 44, parallel to the print drum shaft 30, carries four gears 46, 146, 246, 346 for rotation on the shaft, and these gears constitute the output of a value selection mechanism, (not shown) for example as disclosed in the above-mentioned European Patent Application No. (our ref: E129/2). Briefly stated, the angular displacement of each of these gears is dependent on the value set in the value selection mechanism. Each of these gears is in mesh with a corresponding value selector gear wheel.

As previously stated, it is necessary for the rotatable gear wheel 38 to be locked with respect to the print drum shaft 30 during franking so as to prevent relative rotation therebetween; otherwise, the selected value may be changed. This is achieved by the provision of gear wheels 50, 150, 250, 350 fixed on a drive shaft 52 of the postage meter, respectively arranged to mesh with the value selector gear wheels 38. The drive shaft 52 provides power from a suitable drive means, such as an electric motor, through any required gearing and/or clutch mechanism, if appropriate. The main drive passes via a gear wheel 54 fixedly attached to the drive shaft 52 to a meshing gear wheel 56 fixedly attached to the print drum shaft 30. The gear wheel 54 has a larger diameter than the gear wheel 56, but has the same number of teeth followed by a cut-away portion so that, upon completion of a single revolution of the print drum shaft, drive to the print drum is discontinued (the print drum shaft being locked by a camming arrangement, which is not shown).

Each of the gear wheels 50, 150, 250, 350 has a section of missing teeth terminated by sprung tooth mechanism 58 on the gear wheel 50 (158, 258, 358 on the other gear wheels) similar to that described with reference to FIGS. 1A-1C. FIG. 2 shows the mechanism 58 itself in more detail.

Referring to FIG. 2, one of the sprung tooth mechanisms 58 is shown partially broken away, a tooth member 60 being retained in a slot 62 by a pin 64, a spring 68 biasing the member 60 radially outwardly.

As shown in FIG. 2, the setting gear 46 could not set the value selector gear wheel 38, since the gear wheel 38 is also in mesh with the fixed gear wheel 50. However, this is because, for ease of illustration, FIG. 2 does not show the print drum shaft 30 and the drive shaft 52 in their home positions (i.e. the positions for value setting). The home position of these shafts is instead with the shafts turned substantially through a half revolution each compared to their positions in FIG. 2, whereupon the missing teeth section on each of the gear wheels 50, 150, 250, 350 causes these gear wheels to be out of engagement with the value selector gear wheels 38 in the home position. Thus, in the home position, rotation of the setting gear 46 (from the value selection mechanism) will cause rotation of the value selector gear wheel 38, resulting in operation of the rising tooth mechanism and setting of the pring wheels in the print drum.

The manner of operation of the sprung tooth mechanism 58 is similar to that previously described with reference to FIGS. 1A-1C, in that the mechanism will effect a slight angular adjustment to the gear wheel 38 being engaged if that wheel is not in proper meshing orientation. In the type of mechanism shown in FIG. 2, such misorientation can result from the value selector mechanism being inadvertantly set between two discrete positions so that an "intermediate" value may effectively be set. The problems arising from this have been outlined above, namely:

(i) gear jamming or other damage may occur if two gears attempt to mesh when not in proper alignment;

(ii) the print wheels will also be set between two values, resulting in improper franking; and (iii) one of the rising teeth will also be in an intermediate position, and this may or may not register on the counter in an unpredictable manner.

The sprung tooth mechanism 58 is intended to overcome these various problems arising from such intermediate positioning of the value selection mechanism. As previously stated, the missing teeth gap on the fixed gear wheel 50 allows the print value to be selected via the setting gear 46 on the rotatable value selector gear wheel 38. Once this has been done for all the banks which require resetting (i.e. whichever decades of value needs to be reset) a franking operation may be initiated and the drive shaft 52 causes rotation of the print drum shaft 30 (via gear wheels 54, 56). The value selector gear wheel 38 in the home position is just out of mesh with the teeth on the gear wheel 50, beginning with the sprung tooth mechanism 58. As the gear wheel 50 on the drive shaft 52 begins to rotate, the sprung tooth mechanism 58 will engage with the gear wheel 38, and if an intermediate value has been selected and the teeth are consequently misaligned, the sprung tooth mechanism 58 will realign the gear wheels 38 and 50 as previously described with reference to FIGS. 1A-1C. Thus realignment between the gear wheel 38 and the rising tooth housing 36 will also be achieved (since wheel 34 is in mesh with wheel 50 in this position) and this will result in a discrete value being automatically set both on the print wheels in the print drum, and also at the rising tooth mechanism. Thus intermediate value selection is prevented.

Figure 3:
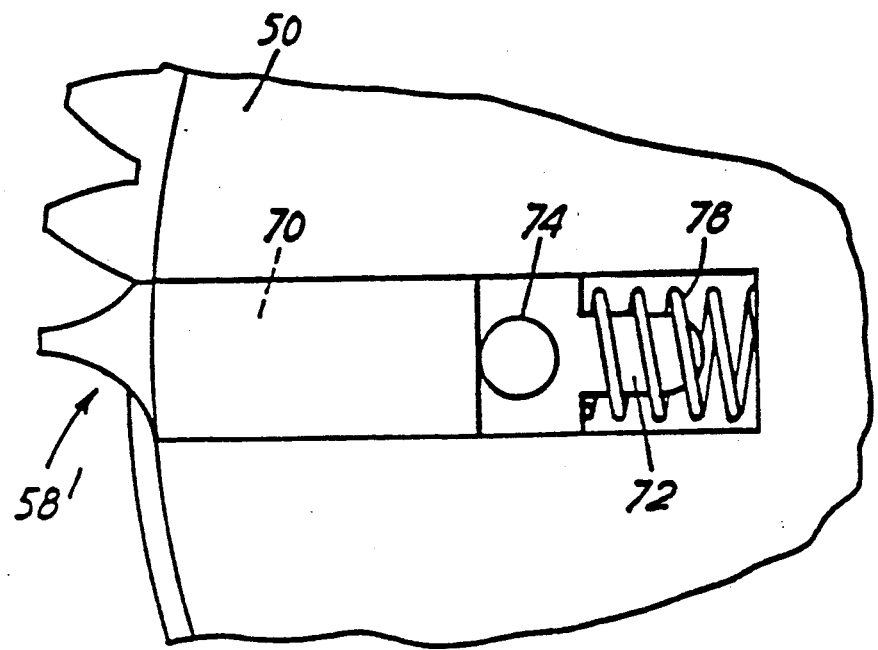
FIG. 3 is a sectional view of a different gear arrangement to that of FIG. 2.
Figure 4:
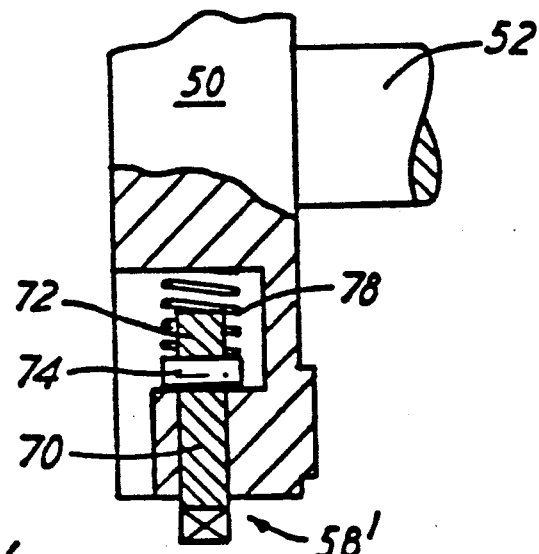
FIG. 4 is a view similar to a part of FIG. 2, but including the different arrangement of FIG. 3.

FIGS. 3 and 4 show a slightly different sprung tooth mechanism 58' provided in the gear wheel 50. in this case the mechanism 58' includes a tooth member 70 projecting through an apeture in the gear wheel 50. A retaining projection 74 and spring 78 at the other end 72 of the tooth member 70 cause the member 70 to be resiliently biased radially outwardly to the same tooth height as the regular teeth on the gear wheel.

FIG. 3 shows the distinctive profile of the sprung tooth with the high point being offset relative to the central longitudinal axis of the sprung tooth, as previously discussed.

It will be apparent that detail variations could be made to the constructions outlined above and such alterations of a minor nature are considered to be within the scope of the invention.

We claim:

1. A gear arrangement for a print drum shaft of a postage meter, the arrangement comprising:
   a print drum shaft and a further shaft arranged parallel thereto;
   at least one value selection gear set mounted on said print drum shaft, said gear set including at lesat one rotatable gear wheel;
   at least one value selection rack slideably positioned in a slot of the print drum shaft, the rack being driveably connected to the gear set such that rotation of said rotatable gear wheel with respect to the shaft is translated into a corresponding displacement of the value-selection rack;
   an aligning gear disposed on said further shaft, said aligning gear being operable for meshing with the rotatable gear wheel of the value selection gear set.
   said aligning gear having gear teeth about the periphery except at a section of said periphery, said aligning gear being arranged such that while said section is positioned adjacent said rotatable gear wheel, said rotatable gear wheel may rotate with respect to said print drum shaft;
   said aligning gear having a resiliently movable tooth located adjacent the section of missing teeth, the peak of said resiliently movable tooth being offset toward an adjacent tooth of said gear teeth; the resiliently movable tooth being operable when the print drum shaft rotates to move inwardly against a resilient means in an inward radial direction when urged by an opposing tooth of the rotatable gear and to align the rotatable gear wheel when the resiliently movable tooth engages the rotatable gear.

2. A gear arrangement according to claim 1, wherein the resiliently movable tooth comprises a tooth member positioned for sliding movement with a radial slot, a spring being provided to bias the tooth member radially outwardly.

3. A gear arrangement according to claim 2, wherein the spring is a compression spring located between a base of the radial slot and the tooth member.

* * * * *